H. OUDINOT & C. PUTOIS.
HYDROPNEUMATIC WHEEL.
APPLICATION FILED JUNE 15, 1908.
923,881.
Patented June 8, 1909.
2 SHEETS—SHEET 2.
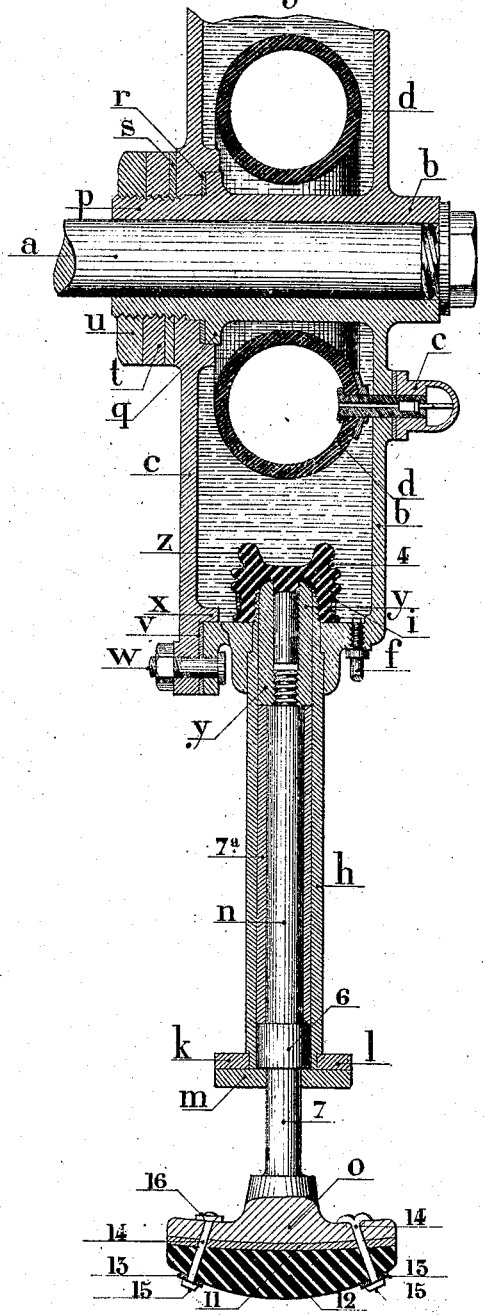
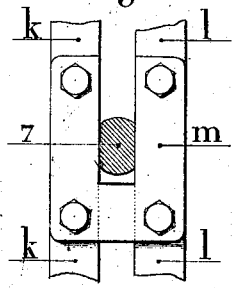
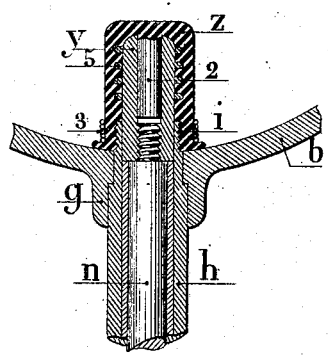
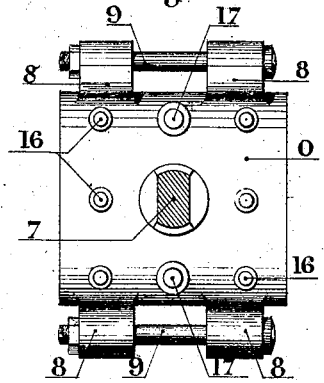
Witnesses:
Inventors

UNITED STATES PATENT OFFICE.

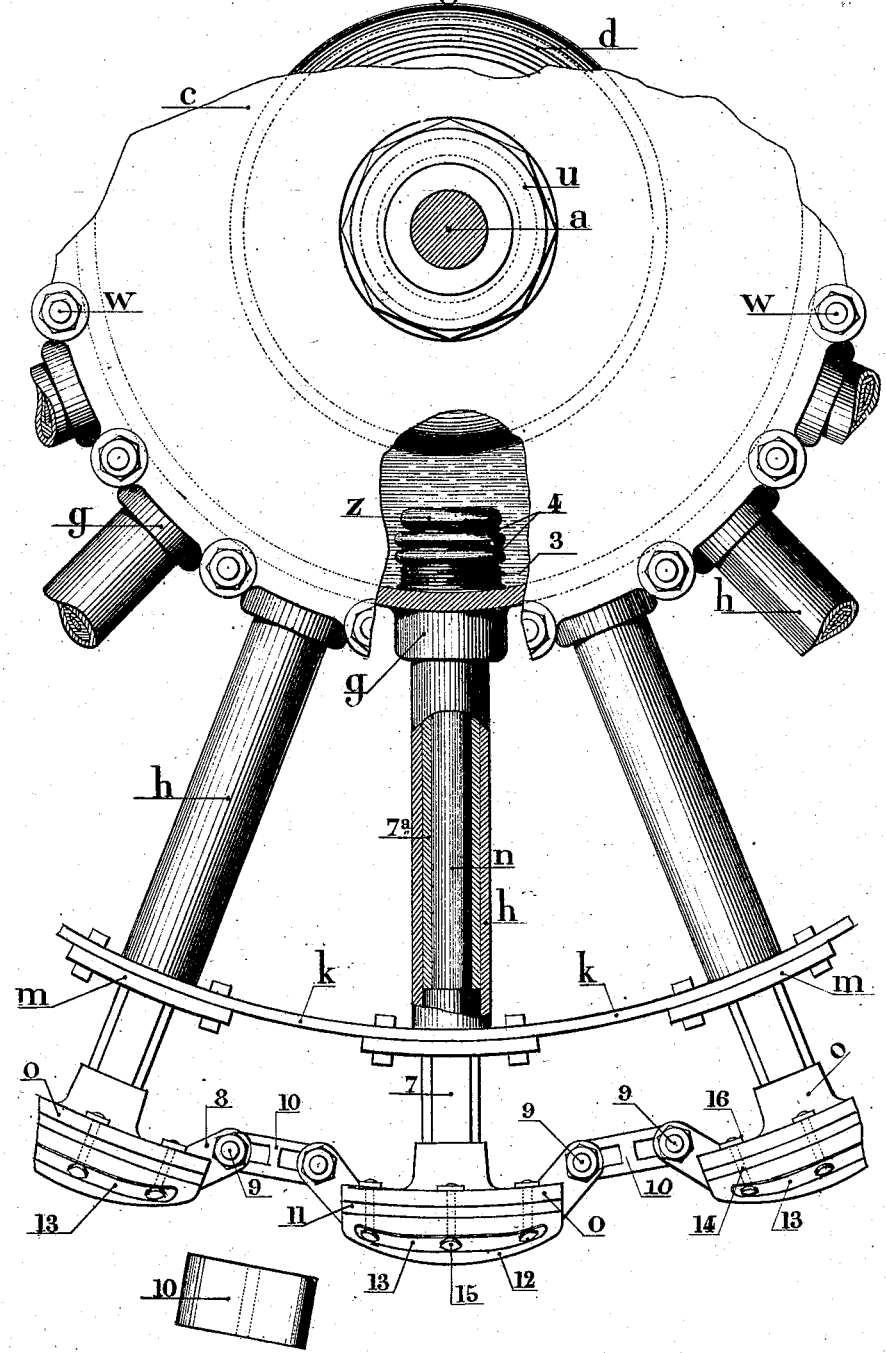

HENRI OUDINOT AND CHARLES PUTOIS, OF PARIS, FRANCE.

HYDROPNEUMATIC WHEEL.

No. 923,881. Specification of Letters Patent. Patented June 8, 1909.

Application filed June 15, 1908. Serial No. 438,691.

*To all whom it may concern:*

Be it known that we, HENRI OUDINOT, Duc de Reggio, and CHARLES PUTOIS, citizens of the French Republic, and residents of Paris, France, have invented new and useful Improvements in Hydropneumatic Wheels, of which the following is a specification.

The present invention relates to hydropneumatic wheels, that is to say, to wheels in which the pressure exerted by the movable spokes is transmitted to an air-chamber by means of a liquid contained in the hollow hub.

The hydropneumatic wheel is shown in the annexed drawings, by way of example, in Figure 1 in a side view, parts of the wheel being represented broken away. Fig. 2 is a section of the wheel taken through the axis of a spoke. Figs. 3 to 5 represent constructional details.

The hub of the wheel is hollow and filled with a suitable liquid. The hub further contains an air chamber of comparatively small size; the spokes have the form of pistons which are adapted to penetrate into the liquid contained in the hollow hub; the spokes are connected at their free ends, on the one hand by an auxiliary rigid felly, and on the other hand by an articulated tread. The cupshaped hub, which is mounted on axle $a$, is closed by a cover plate $c$; it incloses between its two parts $b$ and $c$ the air-chamber $d$ which may be filled with air under pressure by means of a valve $e$; a valve $f$ serves for filling the liquid into the hub. As many tubes $g$ as there are to be spokes are mounted on the periphery of the hub at uniform intervals. Each of said tubes $g$ has a cylinder $h$ which is arranged so that its inner threaded end $i$ projects into the hub. The outer end of each cylinder $h$ is inclosed between the parts $k$ and $l$ of the auxiliary felly, said parts being securely connected by means of a counterplate $m$. Each cylinder $h$ has a piston $n$ whose rod terminates at its outer end in a shoe $o$.

The present invention relates particularly to the constructional details of the wheel with a view to obtain absolute tightness. For this purpose the center part $p$ of the hub has a flange $q$ which corresponds with the collar of the cover plate $c$. The joint is completed by two washers $r$ and $s$ of leather, hemp or the like, a nut $t$ and a counter nut $u$. The tightness of the periphery of the hub is secured by as many bolts $w$ as there are spokes. To prevent the bolts from taking part in the shearing, the inner surface of the cover plate $c$ has an inner flange $x$ which is of the same diameter as the flange of hub $b$ against which it bears.

It is obvious, that any of the well known means and devices may be used for preventing the nuts $t$, $u$ and the bolts $w$ from getting loose, so that there only remains to secure the tightness of the pistons. With this object in view, a tubular piece $y$, which forms the piston, is screwed on the upper or inner screwthreaded end of the corresponding piston rod $n$ and a bag of india-rubber tissue is fixed on the piston $y$. This bag $z$ is shown in Fig. 2 in inoperative position and in Fig. 4 in the stretched position which it assumes when the piston has penetrated into the hub. This india-rubber bag comprises a central rod 2 which is guided in the hollow piston $y$ and it is fixed upon the inner threaded end $i$ of its cylinder $h$ by means of a clamping ring 3, or in any other suitable manner; the tightness of this joint is secured to the threads $i$. The folds 4 of bag $z$, Figs. 1 and 2, are obtained in any suitable manner and calculated so that said bag may stretch to assume the position shown in Fig. 4, without submitting the india-rubber to unnecessary tension, whereby the durability of the device becomes almost unlimited. Further, metal rings 5, which are conveniently covered with fabric, are mounted in the inner surface of the india-rubber bag for diminishing the adherence of said bag to its piston $y$. By the tying up at 3 the tightness of the hollow hub at the places of the pistons is absolutely secured, the free motion of the pistons in the hub not being impeded in any way. The rods $n$ are securely guided, on the one hand, by the piston $y$ and, on the other hand, by a cylindrical enlargement 6 of the rod. The lubricating is effected by means of a cylindrical envelop $7^a$ of felt, which is suitably lubricated and arranged between the cylinders $h$ and their piston rods $n$. The rotation of the piston rods is prevented by means of a flattened part 7 being guided between the two parts of the counterplate $m$.

Castor-oil is preferably used for filling the hub, said oil serving also for lubricating the cylindrical envelop $7^a$.

The spokes terminate at the outer ends in shoes $o$ which have at each side an eye 8 inclined toward the hub and adapted to receive a bolt 9. Two adjacent bolts 9 are connected by means of a link 10. The shoes o have a leather cover 11 and serve for carrying the india-rubber tread 12 (Figs. 1 and 2). Rings 13 serve for maintaining the india-rubber tread 12 parallel with the plane of the wheel, said rings being fixed by means of oblique bolts 14, the heads 15 of said bolts serving at the same time for preventing the skidding of the wheel, their points 16 being conveniently riveted, bifurcated etc. There could further be used larger rivets 17 for preventing the skidding of the wheel. (See Fig. 5).

What we claim is:—

A hydropneumatic wheel comprising in combination a hollow hub consisting of a cupshaped part filled with castor oil and of a cover plate tightly fixed upon said cupshaped part, an air-chamber in said hollow cup, valves for filling the air-chamber and the hollow hub, cylinders fixed in the periphery of the hub at uniform intervals, and screwthreaded inner ends of said cylinders, india-rubber bags in form of bellows tied upon the threaded end of the corresponding cylinder, means for strengthening said idia-rubber bags, the spokes in form of pistons mounted in said cylinders and adapted to penetrate into the hollow hub, said pistons having a tubular inner end part, a guide rod fixed to the bag and engaging with the hollow piston of the corresponding cylinder, a lubricating envelop between the cylinder and the piston rod, an auxiliary felly rigidly connecting the ends of the piston cylinders, shoes at the outer ends of the piston rods, india-rubber treads fixed to said shoes and links for connecting the several treads, substantially as described and shown and for the purpose set forth.

HENRI OUDINOT.
CHARLES PUTOIS.

Witnesses:
DEAN B. MASON,
ALFRED FIER.